(12) United States Patent
Oh

(10) Patent No.: US 6,191,958 B1
(45) Date of Patent: Feb. 20, 2001

(54) HORIZONTAL DEFLECTION APPARATUS

(75) Inventor: In-Hwan Oh, Seoul (KR)

(73) Assignee: Fairchild Korea Semiconductor Ltd. (KR)

( * ) Notice: Under 35 U.S.C. 154(b), the term of this patent shall be extended for 0 days.

(21) Appl. No.: 09/420,437

(22) Filed: Oct. 18, 1999

(30) Foreign Application Priority Data

Aug. 24, 1999 (KR) .................................................. 99-35120

(51) Int. Cl.[7] .................................................. H02M 3/335
(52) U.S. Cl. .................................. 363/20; 363/21; 363/17
(58) Field of Search .................................. 363/20, 21, 16, 363/17; 323/349, 350, 271, 285, 282; 365/227, 226, 189.09

(56) References Cited

U.S. PATENT DOCUMENTS 4,504,779 * 3/1985 Haman .................................. 323/349
4,931,716 * 6/1990 Jovanovic et al. .................... 323/285

* cited by examiner

*Primary Examiner*—Peter S. Wong
*Assistant Examiner*—Rajnikant B. Patel
(74) *Attorney, Agent, or Firm*—Blakely Sokoloff Taylor & Zafman

(57) ABSTRACT

Disclosed is an apparatus for controlling a drive transistor of a horizontal deflection apparatus which comprises a comparator; a switching controller which compares a reference voltage coupled to a non-inverting terminal with a signal provided externally through an inverting terminal and removes noise; a switch including a first switch coupled to a constant voltage and a grounded second switch, either the first or second switch being operated according to an output of the switching controller; a diode; a capacitor; a resistor; and a base current supplier. When the constant current, generated by the constant voltage, is provided through the first switch, the constant current is provided to the base terminal of the transistor through the diode, the transistor is turned on, and the capacitor is charged to as much as a forward voltage drop of the diode, and when the first switch is turned off and the grounded second switch is turned on, the transistor is turned off to discharge the capacitor. The present invention supplies a uniform current to the base terminal or discontinues the supply of the uniform current so as to reduce switching loss of the transistor.

4 Claims, 7 Drawing Sheets

($t_0 \leq t < t_2$)

($t_2 \leq t < t_3$)

($t_3 \leq t < t_4$)

($t_4 \leq t$)

HORIZONTAL DEFLECTION APPARATUS

BACKGROUND OF THE INVENTION (a) Field of the Invention p The present invention relates to a horizontal deflection apparatus. More specifically, the present invention relates to an apparatus for controlling a drive transistor of a horizontal deflection apparatus to reduce switching loss of the drive transistor.

(b) Description of the Related Art

A horizontal deflection apparatus uses horizontal synchronization signals and synchronization to generate sawtooth waves of 15.75 KHz, and provides the sawtooth waves to a horizontal deflection coil in order to scan electron beams of television cathode ray tubes (CRT) or computer monitors in the horizontal direction.

FIG. 1 is a circuit diagram illustrating a conventional horizontal deflection apparatus, and FIG. 2 is a waveform diagram of an equivalent circuit of a controller of a drive transistor. A controller 100 of the drive transistor Q2 is an equivalent circuit of a pulse transformer for providing a base current for the drive transistor Q2.

As shown in FIG. 1, a drive signal to operate a switch Q1 is provided to the switch Q1 from an internal microprocessor. When the switch Q1 is turned on, an inductor current $i_{LB}$ is increased with the passage of time at a slope of $V_B/L_B$ as shown in FIG. 2 since this circuit adopts a forward converter method. Since carriers in the base layer move in the negative direction, the drive transistor Q2 is turned off according to a base current $i_{B2}$ of the drive transistor Q2, and energy is stored in an inductor $L_B$. At this time, when the carriers in the base layer are removed, the base current $i_{B2}$ of the drive transistor Q2 goes into a completely off state, and the base current $i_{B2}$ of the drive transistor Q2 becomes zero.

When the switch Q1 is turned off, the inductor current $i_{LB}$ flows through the base of the drive transistor Q2 in a state decreasing with the passage of time (i.e., at a negative slope) because of the time delay of the inductor $L_B$. Therefore, the drive transistor is turned on. At this time, after the base current $i_{B2}$ of the drive transistor Q2 is provided at a maximum value, the base current $i_{B2}$ is then gradually reduced but continuously maintained in an on state.

When the controller 100 of the drive transistor is operated as above, a resonance switch 110 of the horizontal deflection apparatus operates in four operation modes in an equivalent circuit such as that shown in FIG. 3. Waveforms in the four operation modes are shown in FIG. 4.

FIG. 3(a) shows a first operation mode of the resonance switch 110.

In the first operation mode, the drive transistor Q2 is turned on so that a resonance is not generated, and an inductor current $i_{Ly}$ of a yoke coil $L_y$ is increased from a point t0 to a point t2 in FIG. 4. It is assumed that the current $i_{Ly}$ flowing through the yoke coil $L_y$ flows through a diode D2 coupled to the drive transistor Q2 in parallel, and that the drive transistor Q2 is turned off.

As shown in FIG. 4, when the diode D2 is turned on at the point t0 and a diode current $i_{D2}$ flows, a voltage between a collector and emitter of the drive transistor Q2 becomes zero, and a capacitor Cx in FIG. 1 is charged to generate a capacitor voltage Vx. Therefore, when the drive transistor Q2 is turned on at a zero voltage point t1 (i.e., when the switch Q1 is turned off), a switching loss of the drive transistor Q2 is very low because the switching operation is performed in a zero voltage state.

FIG. 3(b) shows a second operation mode of the resonance switch 110.

As shown, the second operation mode of the resonance switch 110 is performed between the interval t2 and t3. Since the capacitor voltage Vx is provided, the diode D2 is turned off and the current $i_{Ly}$ of the yoke inductor $L_y$ is increased from a negative direction to a positive direction, and a collector current $i_{C2}$ starts to gradually flow through the drive transistor Q2.

At this time, as shown in FIG. 4, a base current $i_{B2}$ of the drive transistor Q2 is reduced from a very high value to a very low value in a zero voltage switching state because of a time delay of the inductor $L_B$ in FIG. 1. On the other hand, a collector current $i_{C2}$ of the drive transistor Q2 is gradually increased because of the yoke inductor $L_y$. In the waveform of the base current $i_{B2}$ of FIG. 4, a current $I_{BF}$ represents a forward bias current to drive the drive transistor Q2, and a current $I_{BR}$ represents a reverse bias current to stop the drive transistor Q2.

The collector circuit $i_{C2}$ gradually increases up to a maximum value $I_{CP}$, and when the current $I_{Ly}$ flowing to the yoke coil $L_y$ reaches a maximum value $I_{LP}$, the second operation mode stops.

FIG. 3(c) shows a third operation mode of the resonance switch 110.

As shown, the third operation mode of the resonance switch 110, which is performed between an interval t3 and t4 of FIG. 4, starts when the switch Q1 is turned on, that is, when the drive transistor Q2 is turned off. When the drive transistor Q2 is turned off, the collector current $i_{C2}$ flowing through the drive transistor Q2 is reduced, and the yoke coil current $i_{Ly}$ flows through a capacitor Cy coupled to the drive transistor Q2 in parallel.

Therefore, as the capacitor Cy is charged, the voltage at the capacitor Cy steeply increases in a sine wave form, the voltage $V_{CE2}$ also increases as a sine wave, and the collector current $i_{C2}$ flowing through the drive transistor Q2 steeply reduces. When a drive status is not maximized in this state, that is, if even a small collector current $i_{C2}$ flows, subsequent switching loss occurs.

The capacitor Cy is discharged by a serial resonance of the yoke coil Ly and the capacitor Cy, and the voltage at the capacitor Cy reduces in a sine wave form.

FIG. 3(d) shows a fourth operation mode of the resonance switch 110.

As shown, the fourth operation mode of the resonance switch 110 is performed after an interval t4 of FIG. 4. When the current is discharged from the capacitor Cy and the voltage at the capacitor Cy becomes negative, the diode D2 coupled to the capacitor Cy in parallel is turned on to complete the fourth operation mode, and the yoke coil current $i_{Ly}$ flows through the diode D2, after which the mode returns to the first operation mode.

Characteristics of the switching loss in the vicinity of the point t3 will now be described in detail.

FIG. 5(a) is a diagram illustrating a switching loss under first base driving conditions during operation of a conventional horizontal deflection device, in which a horizontal deflection frequency is not changed but a magnitude of a base current is changed. Here, the solid lines represent reference base driving conditions, and the dotted lines represent the first base driving conditions.

As shown, when the base current $i_{B2}$ is reduced from the forward bias base current $I_{BF}$ to the reverse bias base current $I_{BR}$ under the reference base driving conditions of the drive transistor Q2, a voltage $V_{CE2}$ between the collector and emitter, and the collector voltage $i_{C2}$ of the drive transistor Q2 are represented by the solid lines around and after the point t3.

When the reverse bias current $I_{BR}$ is not sufficiently small after the point t3, an off switching operation of the drive transistor Q2 is not performed quickly so that the collector current $i_{C2}$ continues to flow. At this time, since the voltage VCE2 steeply increases at the point t3, switching loss of the drive transistor Q2 occurs.

To prevent this energy loss, when the forward bias base current $I'_{BF}$ and the reverse bias base current $I'_{BR}$ are reduced according to the first base driving conditions as shown by dotted lines in FIG. 5(a), the voltage $V'_{CE2}$ is increased since the forward bias base current $I'_{BF}$ for turning on the drive transistor Q2 is small. At this time, the collector current I'C2 is increased to a maximum value before the point t3, thereby resulting in the generation of switching loss.

FIG. 5(b) is a diagram illustrating switching loss under second base driving conditions during operation of a conventional horizontal deflection apparatus. As in FIG. 5(a), the horizontal deflection frequency is not charged but the magnitude of the base current is changed. Here, the solid lines represent reference base driving conditions, and the dotted lines represent the second base driving conditions.

Assuming that, under the second base driving conditions, the forward bias base current $I'_{BF}$ is greater than $I_{BF}$, and the reverse bias base current $I'_{BR}$ is less than $I_{BR}$, since the forward bias base current $I'_{BF}$ is sufficient to turn on the drive transistor Q2, the voltage $V'_{CE2}$ between the collector and emitter is reduced to nearly zero. However, since the base current $I'_{B2}$ is greatly reduced before the point t3, the voltage $V'_{CE2}$ between the collector and emitter is substantially increased. Therefore, since the collector current $I'_{C2}$ in the vicinity of the point t3 is at a maximum, the switching loss is increased.

Therefore, the reverse bias base current $I_{BR}$ of the controller 100 of the drive transistor Q2 is optimized to suit the characteristics of television sets or monitors. However, since the horizontal deflection frequency of the monitors must be modified to adjust the resolution of the monitors, optimization is very difficult.

FIG. 6(a) is a waveform of the reverse bias base current when the horizontal deflection frequency is changed to a higher frequency.

As shown, when changes in the resolution of the monitor increases the horizontal deflection frequency to therefore change the point where the base current $i_B$ becomes zero (i.e., from the point t3 to t'3), the reverse bias base current $I_{BR}$ at the point t3 increases to $I'_{BR}$ at the point t'3.

Therefore, when the reverse bias base current increases over that required to turn off the drive transistor Q2, the drive transistor Q2 is not completely turned off, and switching loss occurs at the point t'3 as a result of the maximum collector current and also the voltage between the collector and emitter.

FIG. 6(b) is a waveform of the forward bias base current when the horizontal deflection frequency is changed to a smaller frequency.

As shown, when changes in the resolution of the monitor decreases the horizontal deflection frequency to therefore change the point where the base current $i_B$ becomes zero (i.e., from the point t3 to t'3), the reverse bias base current $I_{BR}$ at the point t3 decreases to $I'_{BR}$ at the point t'3.

Therefore, when the reverse bias base current decreases below that required to turn off the drive transistor Q2, the moment at which the drive transistor Q2 is turned off becomes point t3, which is earlier than the point t'3 at which the base current becomes completely zero. Accordingly, the voltage between the collector and emitter increases before the point t'3 so that switching loss occurs.

Hence, the drive transistor Q2 experiences almost no switching loss through use of zero voltage switching. However, when the drive transistor Q2 is turned off, very heavy switching loss repeatedly occurs. This is particularly the case when the horizontal deflection frequency is changed to adjust the resolution of the monitor.

In case of controlling the drive transistor of the horizontal deflection apparatus such that the horizontal deflection frequency of a color television is uniform or the horizontal deflection frequency of a computer monitor is varied, much heat is generated in the power switching elements when using the conventional methods. To solve this problem, elements having greater current and voltage capacities, or a heat sink are used. However, both of these methods increase overall costs, particularly the use of the heat sink. Also, reliability is not ensured with the use of the heat sink.

SUMMARY OF THE INVENTION

It is an object of the present invention to provide a horizontal deflection apparatus to reduce switching loss and product costs.

In one aspect of the present invention, in a horizontal deflection apparatus using a horizontal synchronization signal and generating a signal of a predetermined frequency then supplying the signal to a horizontal deflection coil by switching a drive transistor to horizontally scan electron beams of a cathode ray tube (CRT), a method for controlling the drive transistor comprises the steps of: (a) supplying a constant current to the drive transistor to turn on the drive transistor when a first signal is provided; and (b) discontinuing the supply of the constant current to the drive transistor to turn off the drive transistor when a second signal is provided.

The step (a) is characterized in that, when the constant current is supplied, a capacitor coupled to a base terminal of the drive transistor is charged.

The step (b) is characterized in that resulting from the discontinued supply of the constant current, charges charged in a capacitor, which is coupled to a base terminal of the drive transistor, are discharged to thereby control the drive transistor to off.

In another aspect of the present invention, an apparatus for controlling a drive transistor comprises a switching controller comparing a reference voltage with a signal provided externally, and removing noise; a switch comprising a first switch coupled to a constant voltage and a second switch having a first terminal coupled to a first terminal of the first switch and having a second terminal grounded, either the first or second switch being turned on according to an output of the switch controller; and a base current supplier comprising diodes and a capacitor, the base current supplier supplying, when the first switch is turned on and a constant current is supplied from the constant voltage, the constant current to a base terminal of the drive transistor through the diodes so that the drive transistor is turned on and the capacitor is simultaneously charged as much as a forward voltage drop of the diodes, and discharging, when the second switch is turned on, the capacitor and turning off the drive transistor.

The base current supplier is characterized in that an anode of one or the diodes is coupled to the first and second switches, a cathode is coupled to the base terminal of the drive transistor, and the capacitor is coupled to the diodes in parallel.

A cathode of one diode is coupled to an anode of a next diode in series in a predetermined n number of diodes of the base current supplier.

In a further aspect of the present invention, a horizontal deflection apparatus comprises a resonance switch comprising a drive transistor which receives a horizontal synchronization signal to horizontally scan electron beams of a cathode ray tube (CRT) and performs a switching operation; a first diode having a cathode coupled to a collector terminal of the drive transistor and having a grounded anode; a first capacitor having a first terminal coupled to the cathode of the first diode and having a second terminal which is grounded; an inductor having a first terminal coupled to one terminal of the capacitor; and a second capacitor having a first terminal coupled to a second terminal of the inductor and having a second terminal which is grounded, and, performing a zero voltage switching operation according to an output of the drive transistor when the drive transistor is turned on; a controller of the drive transistor supplying a constant current to a base terminal of the drive transistor while a first signal is provided, and discontinuing the supply of the constant current when a second signal is provided; and a horizontal deflection output terminal comprising a transformer having a primary coupled to the collector of the drive transistor, the horizontal deflection output terminal being coupled to the resonance switch to supply energy to a secondary of the transformer.

The controller of the drive transistor comprises a switching controller comparing a reference voltage with a signal externally provided, and removing noise; a switch comprising a first switch having a first terminal coupled to a constant current and a second switch having a first terminal coupled to a second terminal of the first switch and having a second terminal which is grounded, and either the first or second switch being turned on according to an output of the switching controller; and a base current supplier comprising a second diode and a third capacitor, and supplying, when the first switch is turned on and a constant current is supplied from the constant voltage, the constant current to a base terminal of the drive transistor through the second diode so that the drive transistor is turned on and the third capacitor is simultaneously charged as much as a forward voltage drop of the second diode, and discharging, when the second switch is turned on, the third capacitor and turning off the drive transistor.

The base current supplier is characterized in that an anode of the second diode is coupled to the first and second switches, a cathode is coupled to the base terminal of the drive transistor, and the third capacitor is coupled to the second diode in parallel.

The second diode of the base current supplier can be replaced with a predetermined number of diodes in which a cathode of one diode is coupled to an anode of a next diode in series.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
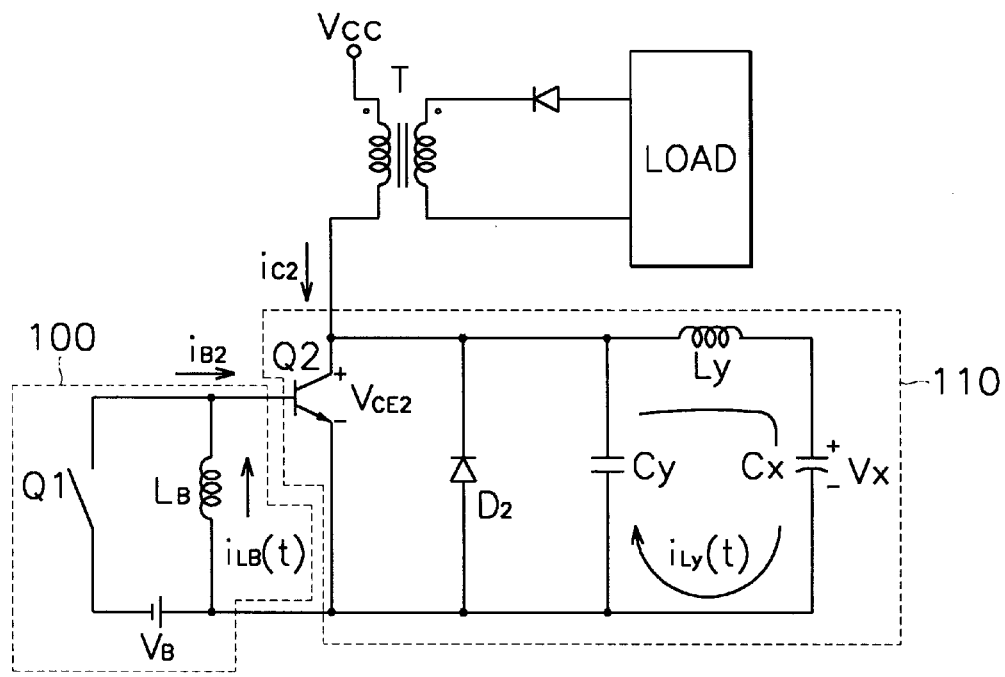
FIG. 1 is a circuit diagram illustrating a conventional horizontal deflection apparatus.
Figure 2:
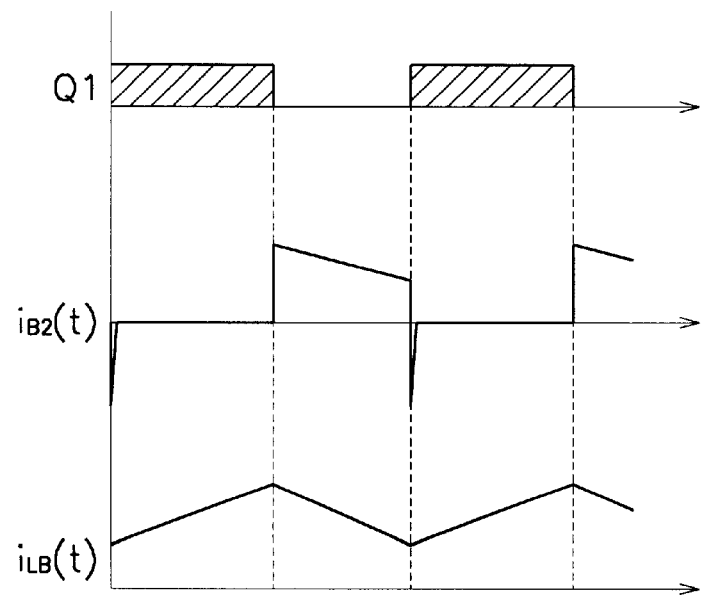
FIG. 2 is a waveform diagram of an equivalent circuit of a controller of a drive transistor.
Figure 3A:
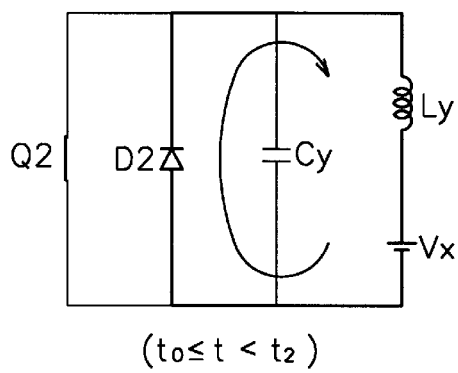
FIG. 3(a) is a first operation mode of a resonance switch shown in FIG. 1.
Figure 3B:
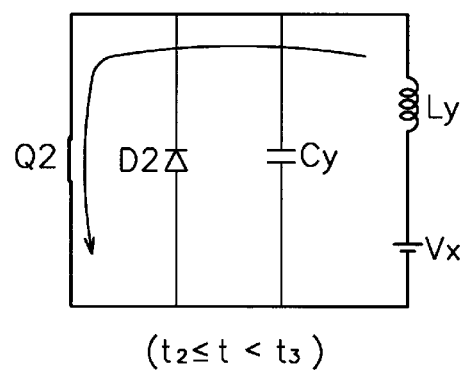
FIG. 3(b) is a second operation mode of the resonance switch shown in FIG. 1.
Figure 3C:
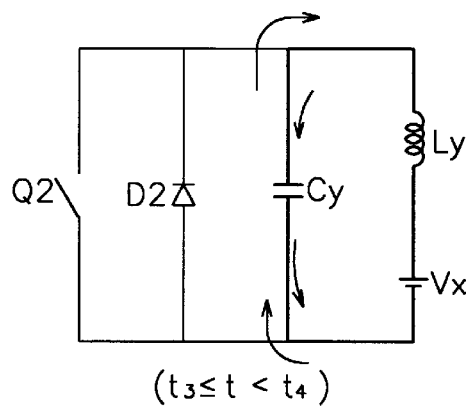
FIG. 3(c) is a third operation mode of the resonance switch shown in FIG. 1.
Figure 3D:
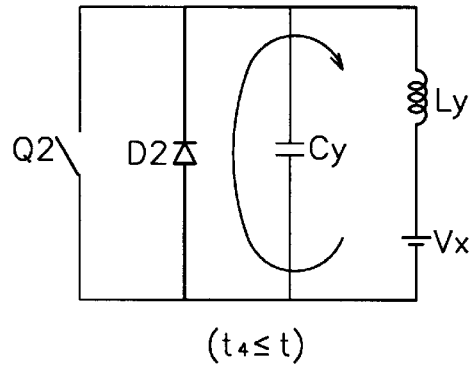
FIG. 3(d) is a fourth operation mode of the resonance switch shown in FIG. 1.
Figure 4:
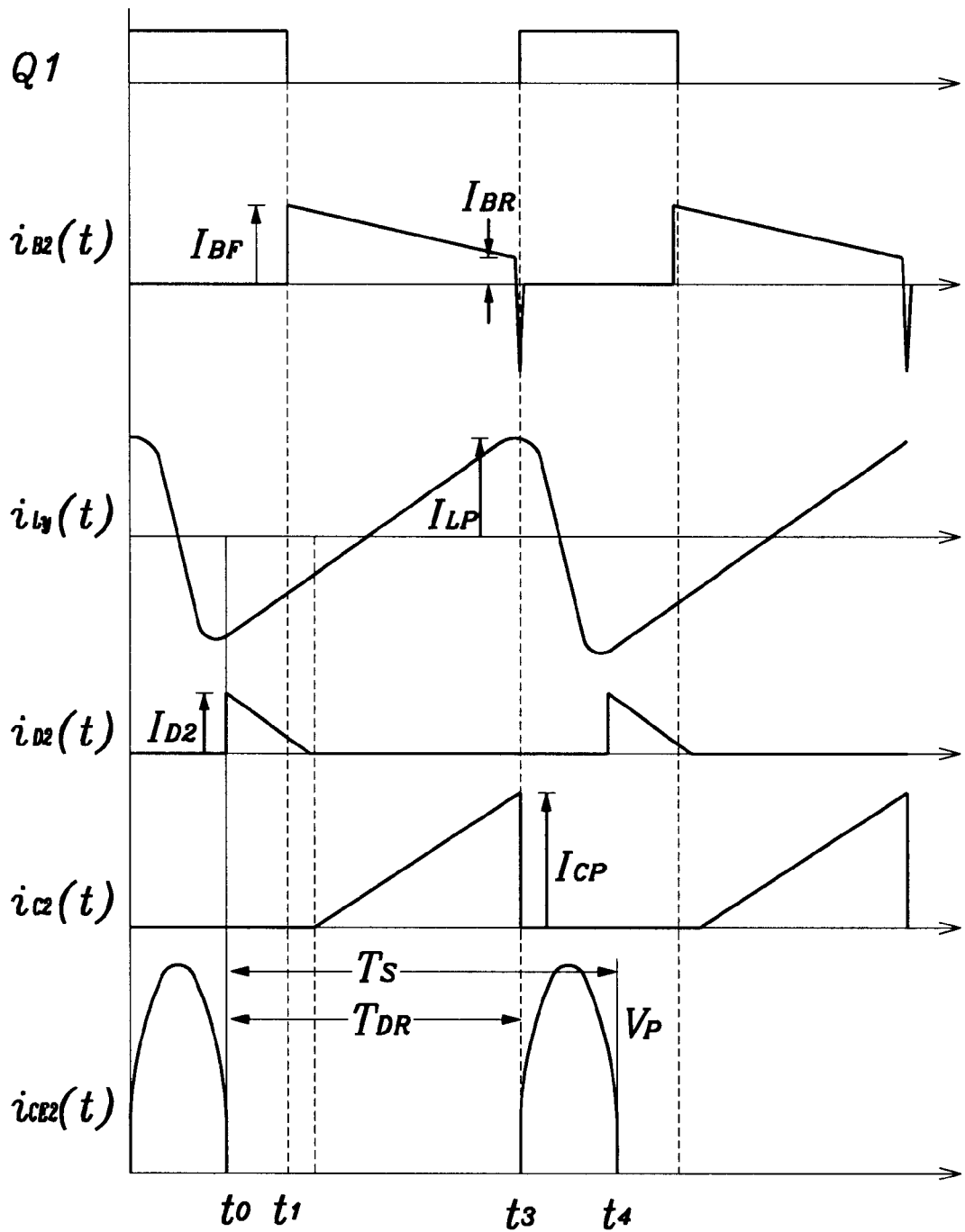
FIG. 4 is a waveform diagram according to operation modes of the resonance switch shown in FIG. 1.
Figure 5A:
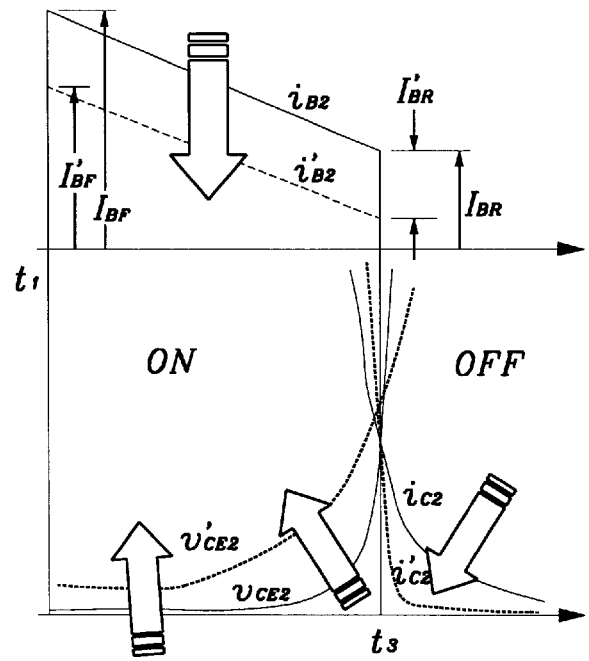
FIG. 5(a) is a diagram illustrating a switching loss under first base driving conditions during operation of a conventional horizontal deflection device.
Figure 5B:
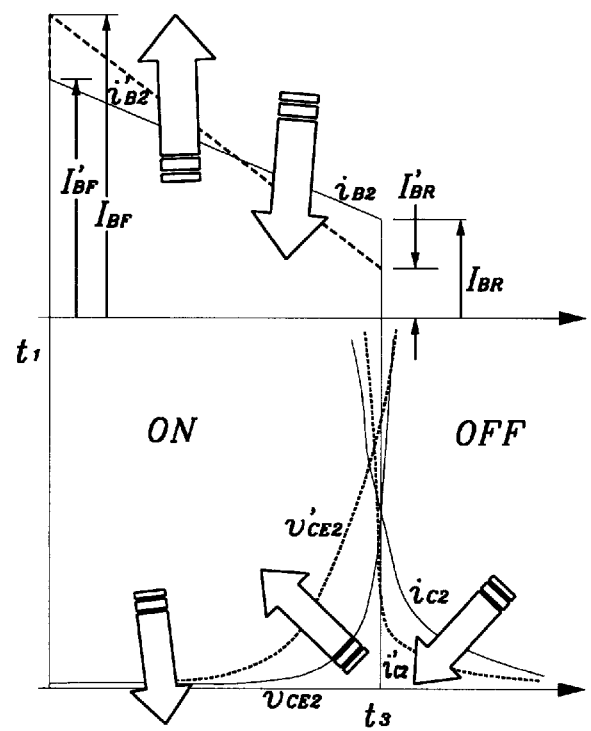
FIG. 5(b) is a diagram illustrating a switching loss under second base driving conditions during operation of a conventional horizontal deflection device.
Figure 6A:
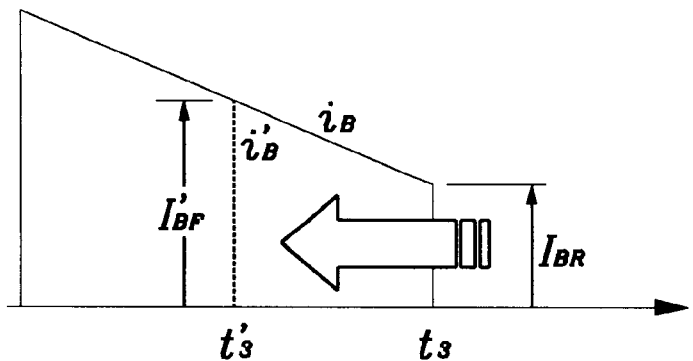
FIG. 6(a) is a waveform of a reverse bias base current when a horizontal deflection frequency is changed to a higher frequency.
Figure 6B:
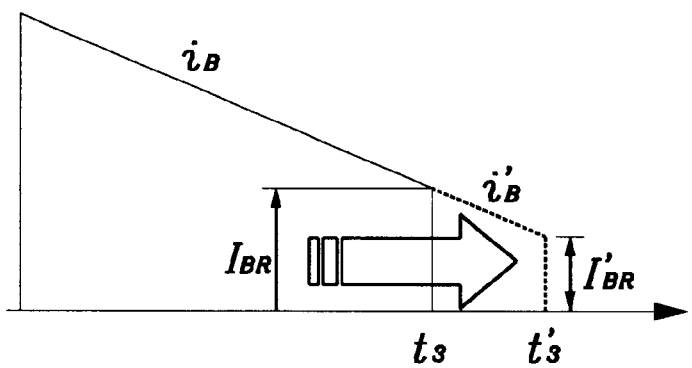
FIG. 6(b) is a waveform of a forward bias base current when the horizontal deflection frequency is changed to a lower frequency.
Figure 7:
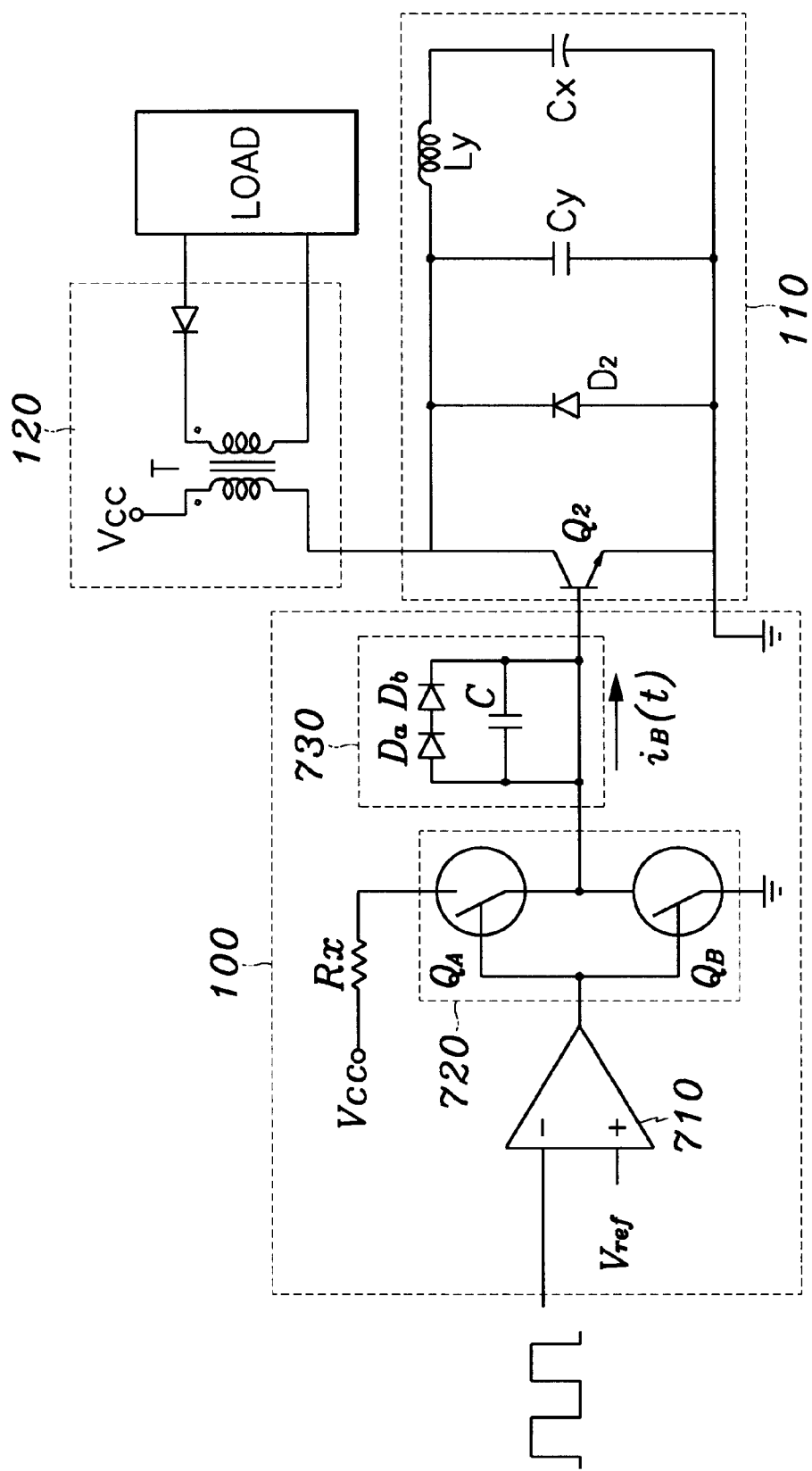
FIG. 7 is a horizontal deflection apparatus according to a preferred embodiment of the present invention.

FIG. 7 is a horizontal deflection apparatus according to a preferred embodiment of the present invention.

As shown, the horizontal deflection apparatus comprises a controller 100 of a drive transistor Q2, a resonance switch 110, and a horizontal deflection output terminal 120.

The controller 100 of the drive transistor Q2 supplies constant current to a base terminal of the drive transistor Q2 while the drive transistor Q2 is turned on, and turns off the drive transistor Q2 by discontinuing the constant current. The controller 100 comprises a switching controller 710, a switch 720, and a base current supplier 730.

The switching controller 710, comprising a comparator, compares a reference voltage Vref provided through a non-inverting terminal with an external signal provided through an inverting terminal, and removes noise below a predetermined level and provided externally. The switching controller 710 then controls a switching operation of the switch 720 using a signal that is over an optimum level.

The switch 720 comprises switches $Q_A$ and $Q_B$. Either switch $Q_A$ or $Q_B$ is operated according to an output of the switching controller 710. The base current supplies 730 comprises diodes Da and Db, and a capacitor C. A cathode of the diode Da is coupled to an anode of the diode Db, an anode of the diode Da is coupled to one terminal of the capacitor C, and a cathode of the diode Db is coupled to another terminal of the capacitor C, thereby forming a parallel structure.

Therefore, if a base current $i_B$ is received through the switch 720, the diodes Da and Db are turned on, and the capacitor C is charged with a charge corresponding to a forward voltage drop of the diodes Da and Db. Here, the magnitude of the base current $I_B$ is a uniform value of Vcc/Rx.

When there is no signal provided from the switch 720, the capacitor C is rapidly discharged and the counter-directional base current $i_B$ is generated such that the drive transistor Q2 is swiftly turned off.

Operation of the controller 100 of the drive transistor Q2 will now be described.

When a high status signal is provided to the inverting terminal of the switching controller 710, the switching controller 710 compares the provided signal with the reference voltage Vref supplied through the non-inverting terminal, and when the switching controller 710 determines the compared signal to be a high status signal over a predetermined level, the switching controller 710 turns on the switch $Q_A$ and turns off the switch $Q_B$ so as to distinguish a signal from noise.

Therefore, when the current supplied from the voltage Vcc passes through the resistor Rx coupled to the voltage Vcc in series, the switch QA of the switch 720, and the diodes Da and Db of the base current supplier 730, the current charges the capacitor C coupled to the diodes Da and Db in parallel as much as the forward voltage drop provided to the diodes Da and Db, and the current then flows to the base of the drive transistor Q2 to turn on the drive transistor Q2.

At this time, the magnitude of the base current $i_B$ to turn on the drive transistor Q2 can be adjusted by the voltage Vcc and the resistor Rx. The base current $i_B$ then maintains a uniform magnitude during the period in which the drive transistor Q2 is turned on. That is, a uniform current $i_B$ flows starting from when the drive transistor Q2 starts to drive to just before the drive transistor Q2 is stopped.

When a low status signal is provided through the inverting terminal of the switching controller 710, the switching controller 710 turns on the switch $Q_B$ of the switch 720 and turns off the switch $Q_A$, thereby discharging the capacitor C as much as the forward voltage drop provided to the diodes.

The base current $i_B$ flowing in a direction opposite that indicated by the arrow of FIG. 7 passes from the drive transistor Q2 to the capacitor C and switch $Q_B$ by the charges discharged from the capacitor C, and the base current $i_B$ initially turns off the drive transistor Q2 when flowing in the negative direction, and becomes zero when the carriers on the base layer are removed.

Therefore, since the switch 720 is operated in the switch mode, switching loss is minimized and the switch can be packaged within a very small IC.

Figure 8:
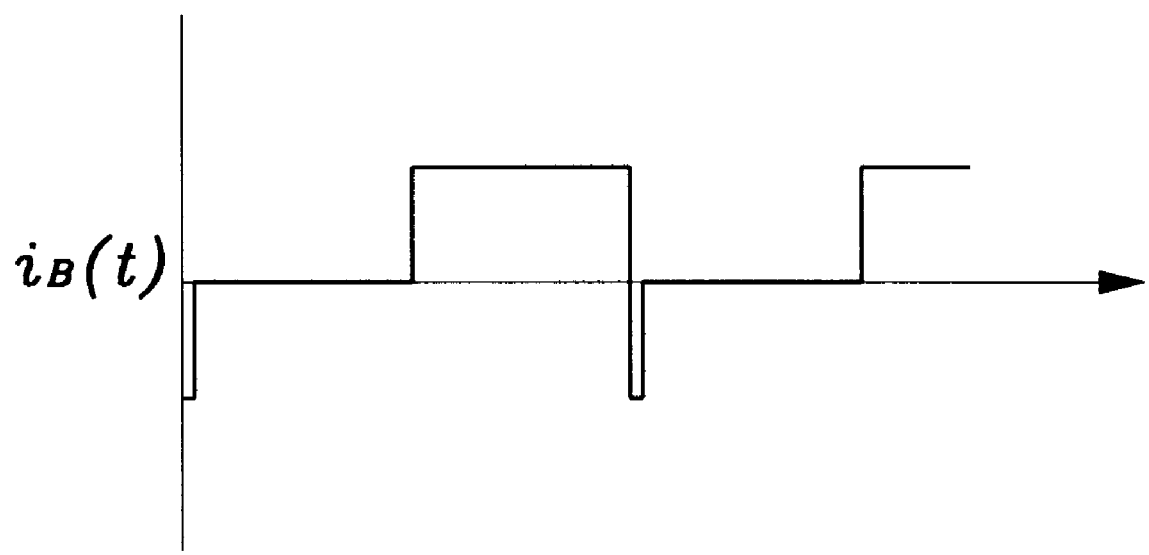
FIG. 8 is a waveform of a base current used to operate the horizontal deflection apparatus shown in FIG. 7.

FIG. 8 is a waveform diagram of the base current used to operate the drive apparatus according to a preferred embodiment of the present invention. As shown, the initial base current to turn on the drive transistor Q2 maintains a uniform value during on intervals, and the controller 100 supplies to the resonance switch 110 the base current which is obtained by dividing the maximum collector current just before being turned off with a current amplification ratio.

Therefore, when a user changes the resolution of the computer monitor, although the horizontal deflection frequency is changed, since the magnitude of the base current $i_B$ is uniform during the on interval of the drive transistor Q2, switching loss can be minimized in case of changes of the resolution of the computer monitor.

The resonance switch 110 comprises the drive transistor Q2 having a base terminal coupled to an output terminal of the controller 100 of the drive transistor Q2 and having a grounded emitter; the diode D2 having a cathode coupled to a collector terminal of the drive transistor Q2 and having an anode terminal which is grounded; the first capacitor Cy having one terminal coupled to the cathode terminal of the diode D2 and having another terminal which is grounded; the inductor Ly having one terminal coupled to one terminal of the capacitor Cy; and the second capacitor Cx having one terminal coupled to another terminal of the inductor Ly and having another terminal which is grounded. When the drive transistor Q2 is turned on, a zero voltage switching operation is performed according to the output of the controller 100 of the drive transistor Q2.

The horizontal deflection output terminal 120, comprising a transformer T having a primary coupled to the collector terminal of the drive terminal Q2, is coupled to the resonance switch 110 and provides energy to a load coupled to a secondary of the transformer T.

Therefore, a uniform current is supplied to the base terminal of the drive transistor Q2 while the drive transistor is turned on so that switching loss of the drive transistor Q2 is minimized.

The drive apparatus according to the preferred embodiment of the present invention does not use a pulse transformer and instead controls a transistor by a switch mode so as to supply a uniform base current. As a result, the size of a heat sink can be minimized by reducing switching loss, thereby reducing the size of the horizontal deflection apparatus, increasing reliability, and reducing product costs.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An apparatus for controlling a drive transistor, comprising:

a switching controller comparing a reference voltage with a signal provided externally, and removing noise;

a switch comprising a first switch coupled to a constant voltage and a second switch having a first terminal coupled to a first terminal of the first switch and having a second terminal grounded, either the first or second switch being turned on according to an output of the switch controller; and a base current supplier comprising diodes and a capacitor, the base current supplier supplying, when the first switch is turned on and a constant current is supplied from the constant voltage, the constant current to a base terminal of the drive transistor through the diodes so that the drive transistor is turned on and the capacitor is simultaneously charged as much as a forward voltage drop of the diodes, and discharging, when the second switch is turned on, the capacitor and turning off the drive transistor, wherein the base current supplier includes an anode of one of the diodes coupled to the first and second switches, a cathode coupled to the base terminal of the drive transistor, and the capacitor coupled to the diodes in parallel.

2. The apparatus of claim 1, wherein a cathode of one diode is coupled to an anode of a next diode in series in a predetermined n number of diodes of the base current supplier.

3. A horizontal deflection apparatus, comprising:

a resonance switch comprising a drive transistor which receives a horizontal synchronization signal to horizontally scan electron beams of a cathode ray tube (CRT) and performs a switching operation; a first diode having a cathode coupled to a collector terminal of the drive transistor and having a grounded anode; a first capacitor having a first terminal coupled to the cathode of the first diode and having a second terminal which is grounded; an inductor having a first terminal coupled to one terminal of the capacitor; and a second capacitor having a first terminal coupled to a second terminal of the inductor and having a second terminal which is grounded, and, performing a zero voltage switching operation according to an output of the drive transistor when the drive transistor is turned on;

a controller of the drive transistor supplying a constant current to a base terminal of the drive transistor while a first signal is provided, and discontinuing the supply of the constant current when a second signal is provided; and a horizontal deflection output terminal comprising a transformer having a primary coupled to the collector of the drive transistor, the horizontal deflection output terminal being coupled to the resonance switch to supply energy to a secondary of the transformer, wherein the controller of the drive transistor comprises:

a switching controller comparing a reference voltage with a signal externally provided, and removing noise;

a switch comprising a first switch having a first terminal coupled to a constant current and a second switch having a first terminal coupled to a second terminal of the first switch and having a second terminal which is grounded, and one of the first and second switch is turned on according to an output of the switching controller; and a base current supplier comprising a second diode and a third capacitor, and supplying, when the first switch is turned on and a constant current is supplied from the constant voltage, the constant current to a base terminal of the drive transistor through the second diode so that the drive transistor is turned on and the third capacitor is simultaneously charged as much as a forward voltage drop of the second diode, and discharging, when the second switch is turned on, the third capacitor and turning off the drive transistor, wherein the base current supplier includes an anode of the second diode coupled to the first and second switches, a cathode coupled to the base terminal of the drive transistor, and the third capacitor coupled to the second diode in parallel.

4. The apparatus of claim 3, wherein the second diode of the base current supplier can be replaced with a predetermined number of diodes in which a cathode of one diode is coupled to an anode of a next diode in series.

* * * * *